B. Yeakel.
Mower.
Nº 19463  Patented Feb. 23, 1858
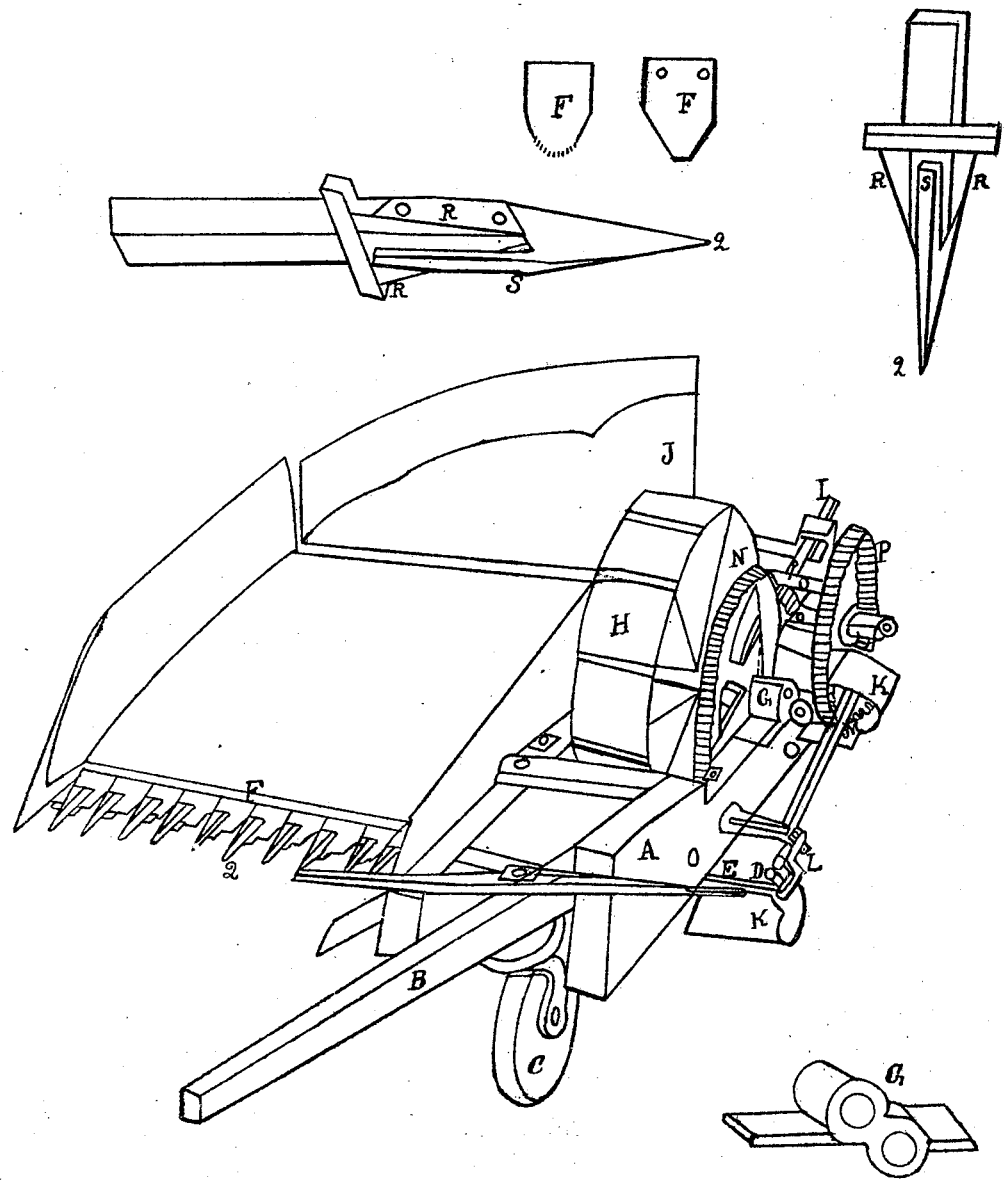

UNITED STATES PATENT OFFICE.

BENJAMIN YEAKEL, OF ALLENTOWN, PENNSYLVANIA.

IMPROVEMENT IN HARVESTERS.

Specification forming part of Letters Patent No. 19,463, dated February 23, 1858.

*To all whom it may concern:*

Be it known that I, BENJAMIN YEAKEL, of Allentown, Lehigh county, State of Pennsylvania, have invented new and useful Improvements on Harvesting-Machines; and I do hereby declare that the following is a full and exact description thereof, reference being had to the accompanying drawing, and to the letters of reference marked thereon, making a part of this specification.

The nature of my invention consists in certain improvements in fingers of harvesters, hereinafter more fully described.

To enable others skilled in the art to make and use my invention, I will proceed to describe its construction and operation.

A is the frame-work; B, the tongue, with a roller, C, to relieve the draft of the horses; D, an oil-box attached to the pitman E, which is self-oiling, for the purpose of making the pitman which operates the cutters F work easier and freer.

G are double boxes—one below the other—in which the ends of axle of ground-wheel H operate, and are for the purpose of raising or lowering the machine, so as to run higher or lower, according to the height or kind of grain or grass to be cut; I, the horizontal lever for throwing the machine in or out of gear; J, the back end of platform, which is raised to an incline between an inch and a foot in height for the purpose of throwing off the grain regularly on the ground. The platform is taken off when grass is to be cut.

K are shields, which are of sheet-iron, bent round and covering over the gearing devices, so as to prevent the grass from choking up or entangling in the crank L or pinion-wheel M.

N is a driving-wheel, (on the axle of ground-wheel H.) which gears into the pinion-wheel O and drives the bevel-wheel P, which gears into the pinion-wheel M and operates the crank L and pitman E.

Figure 2 represents the teeth or fingers, and above which the knives or cutters operate. The cutters F are to be made either with a plain or sickle edge. The cutters R are attached to the sides of the teeth Q with screws or rivets, and can be made broader or narrower, as may be required. The guard S, above, is to prevent choking. The knives or cutters R are angular-shaped, the face or one side being set level with the upper side of the finger or tooth Q, and the other side, being bent downward, is secured or riveted to the side of the tooth Q. An angular-shaped cutter is thus permanently fastened one on each side of the tooth. The tooth is fixed permanently to the front end of the platform, and the cutter R, tooth Q, and guard S are solidly combined.

What I claim as my invention, and desire to secure by Letters Patent, is—

The combination of the finger Q, cutters R, and guard S, arranged and constructed substantially as herein described.

BENJAMIN YEAKEL.

Witnesses:
JNO. D. LAWALL,
JOSHUA STAHLER.